Sept. 16, 1952 — E. H. SLADE — 2,610,759
FROZEN FOOD LOCKER PARTITION DEVICE
Filed April 3, 1951
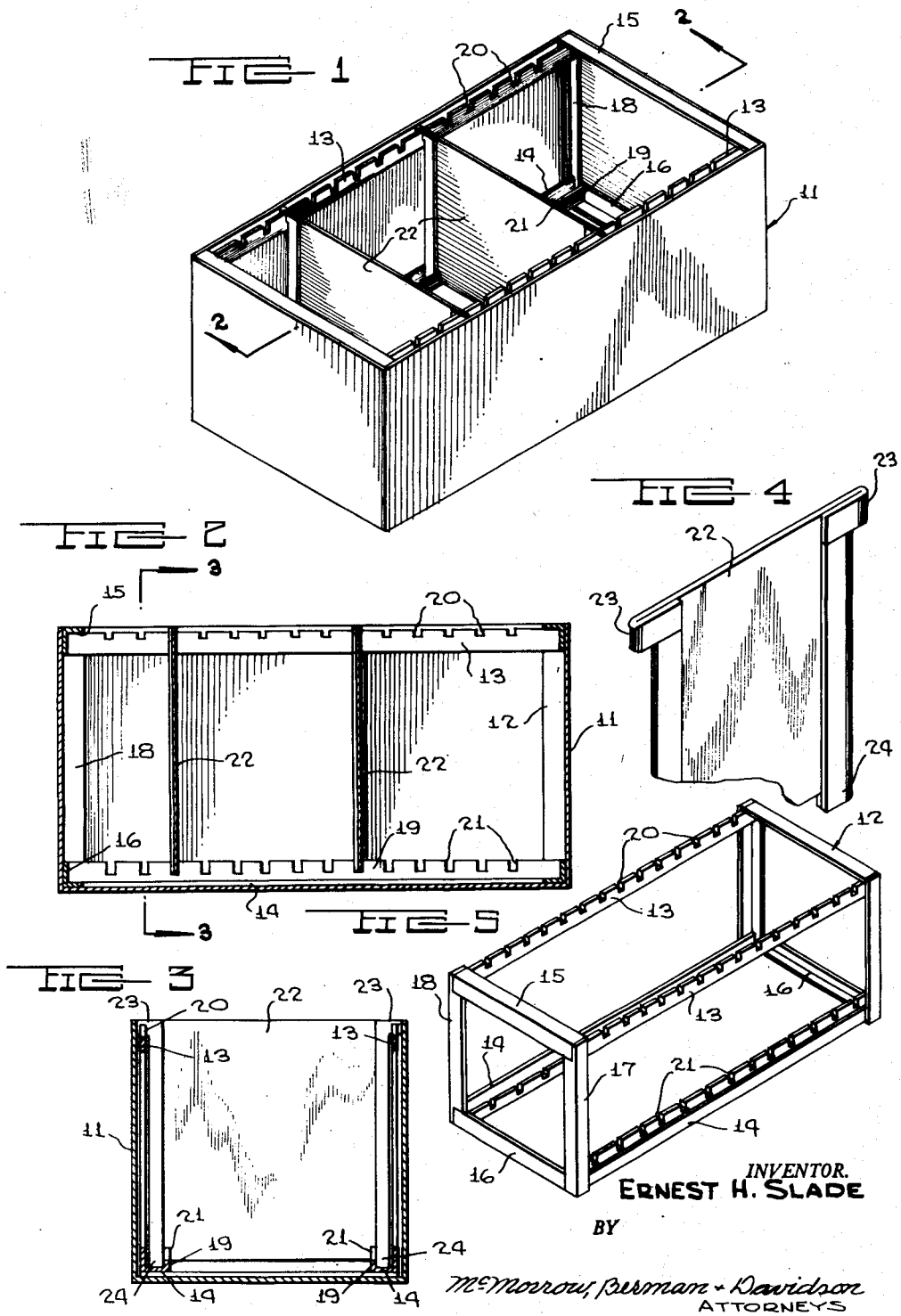
INVENTOR.
ERNEST H. SLADE
BY
McMorrow, Berman & Davidson
ATTORNEYS Patented Sept. 16, 1952

2,610,759

UNITED STATES PATENT OFFICE 2,610,759

FROZEN FOOD LOCKER PARTITION DEVICE

Ernest H. Slade, Los Alamos, N. Mex.

Application April 3, 1951, Serial No. 219,070

2 Claims. (Cl. 220—22)

This invention relates to frozen food lockers, and more particularly to partition devices for dividing up the space in frozen food lockers.

A main object of the invention is to provide a novel and improved space-partitioning device for frozen food lockers which is simple in construction, which is readily installed in conventional frozen food lockers, and which is readily adjustable to provide any desired number of separate compartments in the locker.

A further object of the invention is to provide an improved partitioning device for frozen food lockers which involves inexpensive parts, which is sturdy in construction, which is readily adjustable to provide desired spacings of the partitions thereof, and which provides a great saving in time during the process of removing articles from frozen food lockers by enabling the articles to be stored in individual compartments, whereby they may be readily found when desired.

Further objects and advantages of the invention will become apparent from the following description and claims, and from the accompanying drawings, wherein:

Figure 1 is a perspective view of a conventional rectangular frozen food locker provided with an improved partitioning means constructed in accordance with the present invention;

Figure 2 is a vertical cross-sectional view taken on line 2—2 of Figure 1;

Figure 3 is a transverse, vertical, cross-sectional view taken on line 3—3 of Figure 2;

Figure 4 is an enlarged, fragmentary, perspective view of one of the partition elements employed in the improved partitioning means of Figures 1 to 3;

Figure 5 is a perspective view of the frame member of the partitioning device of Figures 1 to 3.

Referring to the drawings, 11 designates a conventional rectangular frozen food locker which may be of any suitable material, such as sheet metal or the like, as customarily employed in the construction of such lockers. Designated generally at 12 is a rectangular frame comprising the longitudinally extending top bars 13, 13, the longitudinally extending bottom channel bars 14, 14 and respective end frames of rectangular shape connecting the ends of the bars 13, 13 and 14, 14 to define the aforesaid rectangular frame. Each of the end frames may comprise the top and bottom angle bars 15 and 16, and the vertical angle bars 17 and 18, as shown in Figure 5. As shown in Figure 3, the top bars 13, 13 are rectangular in cross-section and are in the same vertical planes as the outside vertical flanges of the bottom channel bars 14, 14. The inside flanges of the channel bars 14, 14, designated at 19, 19 are inwardly offset relative to the top bars 13, 13. The top bars 13, 13 are formed with the uniformly spaced, upwardly facing notches 20, and the inner flanges 19 of the bottom channel bars 14 are formed with the similar uniformly spaced, upwardly facing notches 21, the notches 21 being in the same transverse vertical planes as the notches 20 in the top bars 13, 13.

Designated at 22 are respective transverse partition members which may be disposed inside the framework 12 and releasably locked therein by engagement with the notches 20 and 21. Each partition member 22 is generally rectangular in shape and is formed at its top corners with the outwardly projecting lug elements 23, 23 and is formed at its bottom corners with the downwardly projecting lug elements 24, 24. The partition members 22 are adapted to fit transversely inside the framework with the lugs 23, 23 receivable in the notches 20 of the respective opposite top bars 13, 13 and with the bottom lugs 24, 24 receivable in the respective channel bars 14, 14 with the bottom edge of the main body of the partition members 22 receivable in notches 21 of the inner flanges 19 of said channel bars. It will be readily apparent that a partition member 22 may be readily disengaged from the framework 12 by elevating said partition member to disengage the lugs 23, 23 from the notches 20 and to disengage the bottom edge of the body of the partition member from the notches 21. A partition member 22 may therefore be readily disengaged and moved to a different position merely by elevating the partition member, shifting the partition member longitudinally in the frame 12 and reengaging said partition member at the desired location thereof in the framework.

In installing the partitioning device, the framework 12 is merely slipped into the rectangular locker 11, said framework being dimensioned so as to fit in a conventional locker, and a desired number of partition members 22 are then mounted in the framework, spaced at desired locations along the framework to provide compartments of desired size in the locker.

It will be readily apparent that any desired number of compartments may be provided in the locker by merely providing the required number of removable partition elements 22. It will be further apparent that the relative size of each compartment may be adjusted simply by adjusting the positions of the partition members 22 which define the compartment.

While a specific embodiment of an improved partitioning means for a frozen food locker has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a frozen food locker of the character described, a removable rectangular frame having parallel top and bottom pairs of longitudinal side elements, the bottom side elements comprising upwardly facing channel bars whose inner flanges are inwardly offset relative to the top side elements, said top side elements and said inner flanges being formed with spaced upwardly facing notches, a transverse partition member receivable in said frame, and means on said partition member lockingly engageable with said notches and being arranged for disengagement responsive to elevation of the partition member relative to the frame.

2. In a frozen food locker of the character described, a frame comprising parallel top longitudinal elements, parallel bottom longitudinal elements, and means rigidly connecting the ends of said longitudinal elements, said top longitudinal elements being formed with upwardly facing notches, said bottom longitudinal elements comprising upwardly facing channels having inner flanges inwardly offset relative to said top longitudinal elements, said inner flanges being formed with spaced upwardly facing notches.

ERNEST H. SLADE.

REFERENCES CITED

The following references are of record in the file of this patent:

UNITED STATES PATENTS

| Number | Name | Date |
|---|---|---|
| 1,523,136 | O'Connor | Jan. 13, 1925 |
| 2,257,536 | Roycraft | Sept. 30, 1941 |
| 2,346,316 | Lumley | Apr. 11, 1944 |

FOREIGN PATENTS

| Number | Country | Date |
|---|---|---|
| 24,278 | Australia | Sept. 3, 1935 |